United States Patent [19]
Jones

[11] 3,851,751
[45] Dec. 3, 1974

[54] METHOD AND APPARATUS FOR FORMING, FILLING AND SEALING PACKAGES

[75] Inventor: Wickliffe Jones, Cincinnati, Ohio

[73] Assignee: R. A. Jones & Company, Incorporated, Covington, Ky.

[22] Filed: Apr. 26, 1972

[21] Appl. No.: 247,574

[52] U.S. Cl. ................................. 198/179, 198/25
[51] Int. Cl. ............................................. B65g 15/00
[58] Field of Search ....... 198/179, 180; 53/371, 386

[56] References Cited
UNITED STATES PATENTS
3,191,522 6/1965 Drake ................................ 198/179

Primary Examiner—Richard E. Aegerter
Attorney, Agent, or Firm—Wood, Herron & Evans

[57] ABSTRACT

Continuous motion apparatus for forming, filling and sealing pouches in which a web of material is folded longitudinally upon itself, transversely sealed at spaced locations, cut into individual pouches and carried by vacuum carriers through opening, filling, sealing and depositing into product buckets of a cartoner. The pouches are conveyed in part by an endless chain having a plurality of vacuum operated devices spaced along the chain with tubing serially interconnecting the vacuum devices and means for applying vacuum to the devices over at least a portion of their excursion.

2 Claims, 7 Drawing Figures

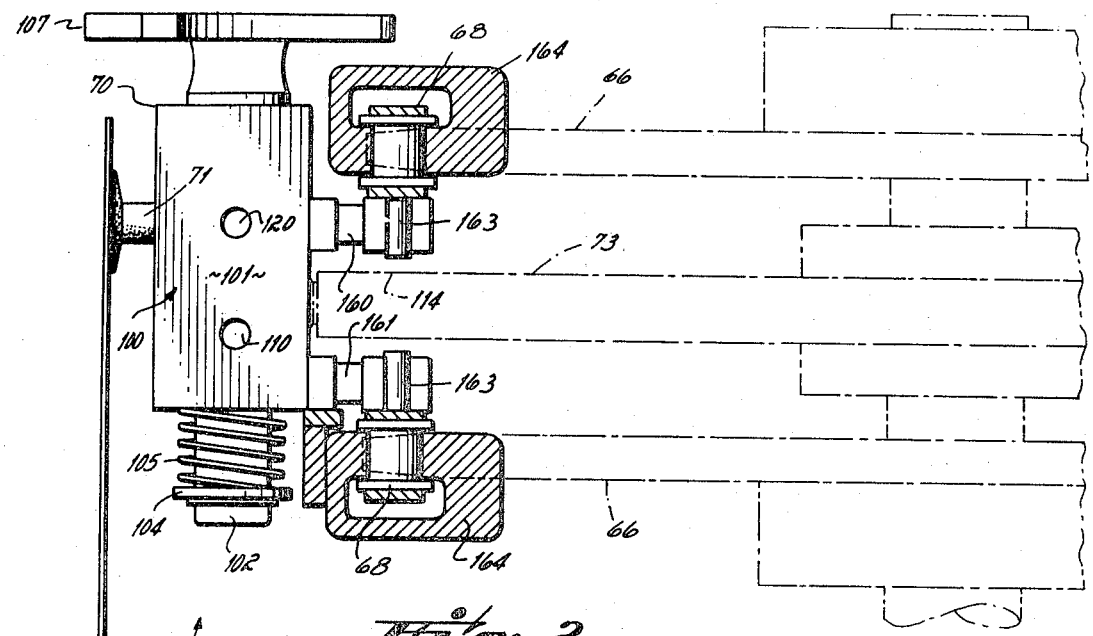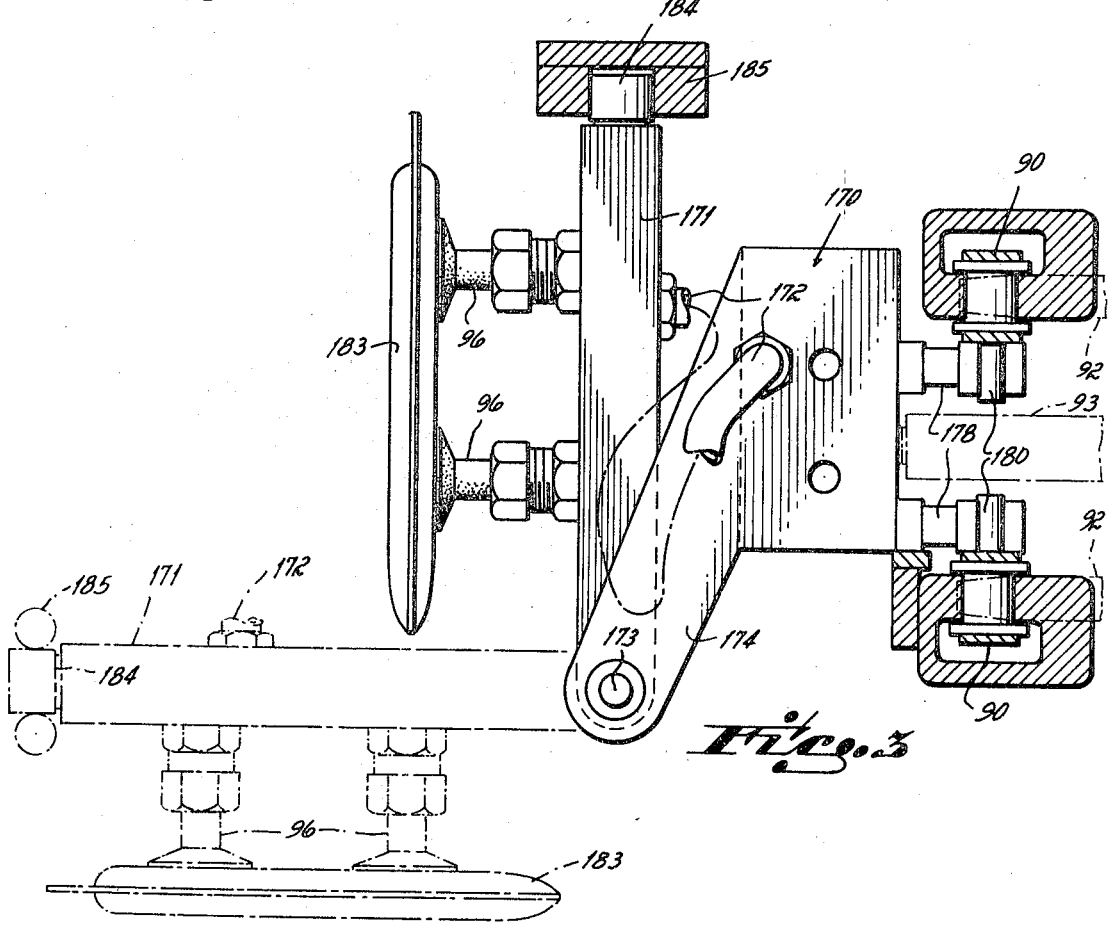

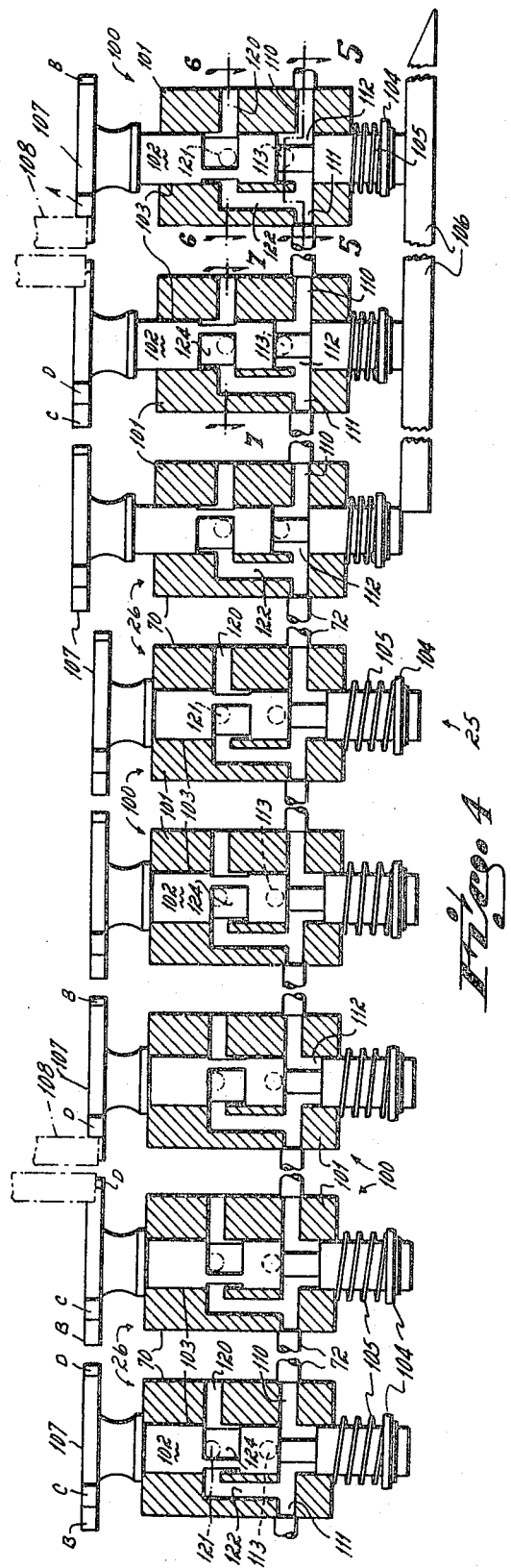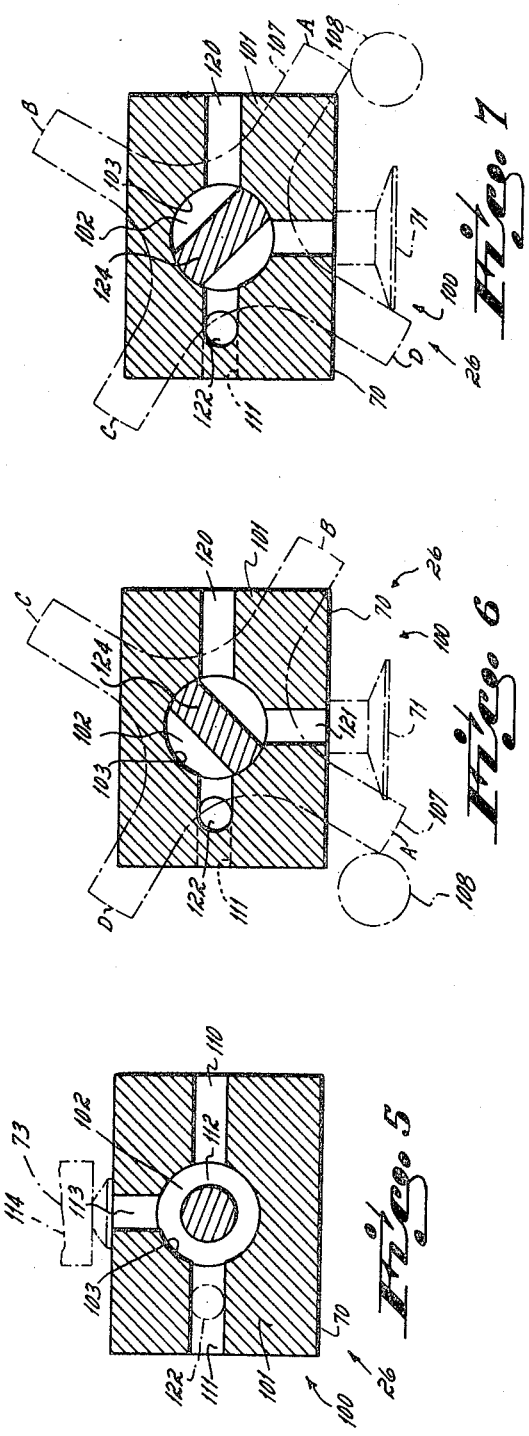

METHOD AND APPARATUS FOR FORMING, FILLING AND SEALING PACKAGES

This invention relates to continuous motion apparatus for forming, filling and sealing pouches.

There are basically two different types of pouch-forming machines in use. In one type, pouches are formed, filled and sealed while in the form of web, the filled, sealed pouches being cut from the web following the sealing of the mouth of the pouch. These machines operate fairly satisfactorily but have at least two disadvantages. First, they do not admit of any variation in the width of the pouch. Therefore, for an operation in which pouches of various sizes must be filled, the processer is required to have a special machine for each size of pouch.

Second, because of the fact that the pouches are attached to one another in web form, it is difficult to open them wide enough to fill them with large quantities of material.

The second type of machine is that in which the pouches are first formed and then cut into individual pouches which are filled and sealed. The processing of individual pouches permits variation of width and imposes no restriction on the extent to which the pouches can be opened, thereby enabling the pouches to be filled with maximum amounts of material. Machines of this type, however, have their disadvantages, the disadvantages arising primarily out of the fact that the pouches as separate elements are far more difficult to control than pouches which are attached to one another in web form. To control the individual pouches, present machines require much mechanical structure which tends to decrease the reliability of the machine and require high maintenance costs as well as high initial cost in the building of the machines. This is particularly true in the case of machines for processing pouches formed of soft films as contrasted to paper or foil pouches, for the soft films do not have that degree of stiffness which permits them to be easily controlled, opened and the like.

An objective of the invention has been to provide a new vacuum conveyor having a plurality of spaced carriers mounted on chains moving in an irregular endless path. Heretofore, in conveyors of this type it has been necessary to provide tubing from a central vacuum supply to the individual carriers in somewhat of an octopus fashion with the requirement that the tubing have considerable slack where the conveyor passes close to the source so as to enable the tubing to extend to those points on the conveyor more remote from the source. In accordance with the present invention, the conveyor has its vacuum carriers serially interconnected by tubing. Each carrier includes a valve structure which permits the carriers to be evacuated as they pass by a vacuum station, air not only being withdrawn from the individual carrier but through the series tubing connection through all carriers on the conveyor.

The invention more specifically contemplates a new valve structure including a rotatable and reciprocable spool which permits each carrier to have vacuum applied to it at one portion of its excursion and to be individually exhausted to atmosphere at the remaining portion of its excursion, to release a pouch, without exposing any of the adjoining carriers in the system to atmosphere.

These and other objectives of the invention will become more readily apparent from the following detailed description taken in conjunction with the accompanying drawings in which:

FIG. 2 is an elevational view partly in section of a vacuum carrier;

FIG. 3 is an elevational view partly in section of a vacuum carrier for the transfer conveyor;

FIG. 4 is a diagrammatic developed view partly in section of the carriers and specifically their valve structures for the first conveyor taken generally along line 4—4 of FIG. 1;

FIG. 5 is a cross sectional view taken along lines 5—5 of FIG. 4;

FIG. 6 is a cross sectional view taken along lines 6—6 of FIG. 4; and

FIG. 7 is a cross sectional view taken along lines 7—7 of FIG. 4.

GENERAL ORGANIZATION AND OPERATION

Figure 1:
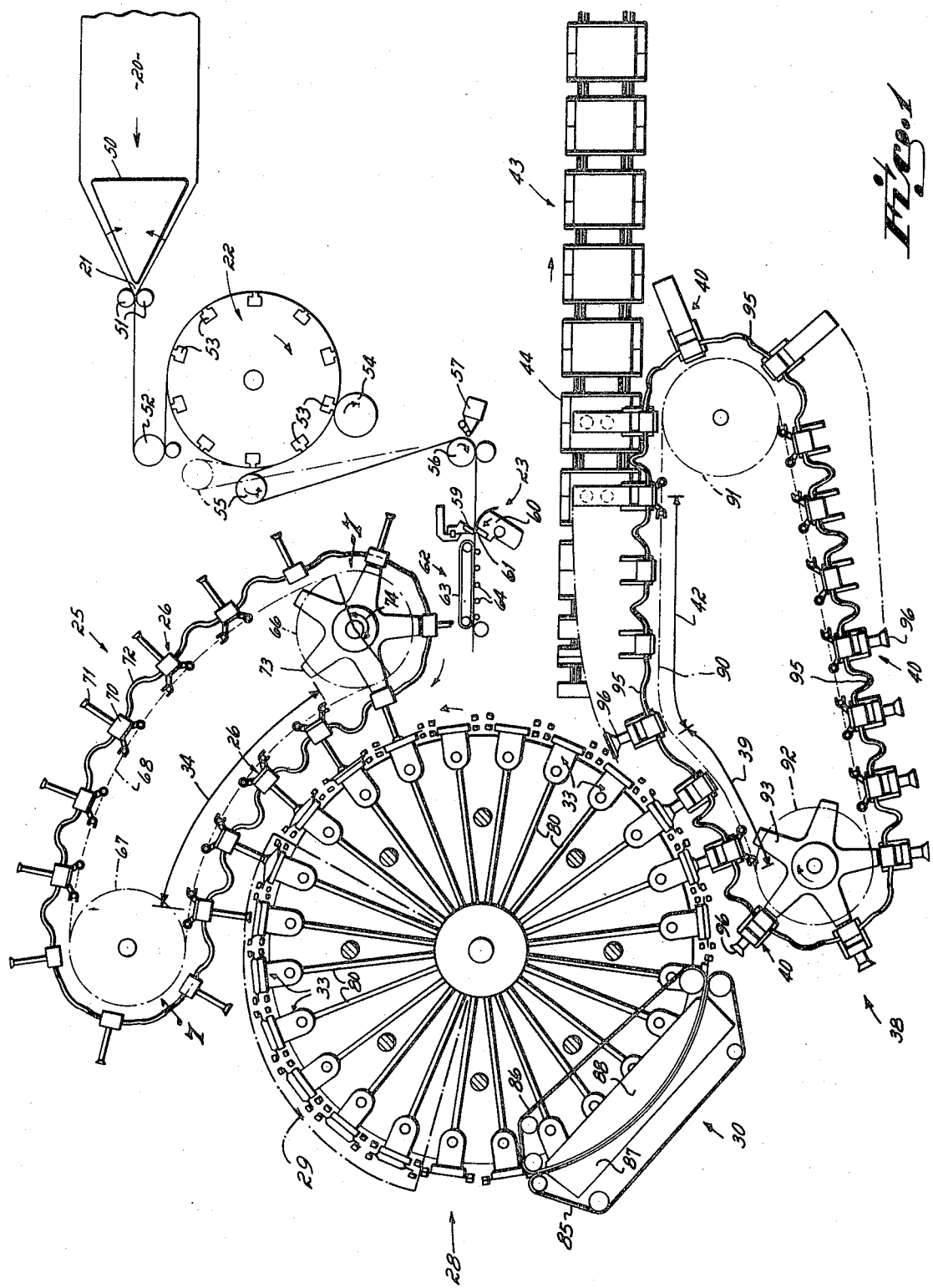
FIG. 1 is a diagrammatic plan view of the apparatus.

Referring to FIG. 1, a web 20 is first folded longitudinally at 21 and is then passed about a sealing drum 22 wherein transverse seals are uniformly spaced along the length of the web. The web is passed through a cutting station indicated at 23 where it is severed along the seals to form individual pouches. The individual pouches are transferred to a first conveyor 25 where they are engaged by vacuum carriers in the form of suction cups 26. The first conveyor brings the individual pouches into juxtaposition to a second conveyor 28 in the form of a rotating drum. The drum has a filling station indicated diagrammatically by a phantom line at 29 overlying it and a sealing station 30 downstream of the filling station. The second conveyor has vacuum carriers 33 spaced around its periphery, the carriers being adapted to engage the side of the pouches opposite the suction cups 26 as the first and second conveyors move past each other. The first conveyor has a portion of its run as indicated at 34 which diverges slightly from the path of the carriers 33 on the drum 28. The slight divergence in the paths of the two conveyors enables the vacuum carriers to pull the walls of the individual pouches apart so that they will admit a filling spout as indicated diagrammatically at FIG. 4.

The pouches are filled by the time they arrive at the sealing station 30. At the sealing station, the mouths of the pouches are preferably stretched slightly to pull out any wrinkles and are then passed through a sealing station to seal the mouths of the pouches.

A third conveyor 38 having vacuum carriers 40 is located adjacent to the sealing station, the third conveyor having a short portion of its run as indicated at 39, bringing carriers 40 into contact with the pouches held by the carriers 33 on the second conveyor. After the pouches are contacted by the carriers 40, the carriers 33 are connected to atmosphere to release the pouches to permit them to be carried by the carriers 40.

The carriers 40 are pivotally mounted and cam-actuated to pivot downwardly through an angle of 90° to bring the pouches to a horizontal attitude. The pivoting of the pouches occurs in that portion of the run indicated at 42. Passing beneath the conveyor 38 is a bucket conveyor 43 associated with a cartoning machine not shown. At predetermined intervals, the carriers 40 are connected to atmosphere to release the pouches when they overlie preselected buckets 44 in the bucket conveyor. By predetermining the relative speeds of the pouch-forming apparatus and the bucket conveyor as well as the timing of these pouches, one or more pouches can be dropped into each bucket 44. The pouches in the individual buckets are transferred into cartons in the cartoning apparatus in a known manner.

Referring to the structure in more detail, the web 20 is normally supplied from a roll, not shown, and may or may not be preprinted. The web may be a single ply of heat-sealable film, or may be a laminate of a heat-sealable film paper or foil, the heat-sealable film being on the inside of the pouches so that the seals at the edges of the pouch can be formed. The folding of the web is performed by a conventional plow indicated diagrammatically at 50 downstream of which are two rolls 51 forming a nip through which the folded web passes. The web then passes over an idler roll 52 and onto the sealing drum 22. The sealing drum has continuously heated sealing units 53 spaced uniformly around its periphery, the sealing units engaging the web as it passes around the drum to form spaced transverse seals, thereby dividing the web into pockets which will be cut into pouches. A pressure roll 54 engages the outside surface of the web as it passes around the sealing drum so as to provide assurance of a good sealing contact with the heating elements 53.

The web leaves the drum and passes about a dancer or tension roll 55 which may be chilled to complete the transverse sealing of the web. From the dancer roll 55 the web passes over idler roll 56 which has a photoelectric cell 57 associated with it, the roll 56 and cell 57 cooperating to provide proper register of the printing with the seals and cutting mechanism so that the transverse seals are properly related with respect to the printing matter and so that the pouches are cut through the center of the transverse seals. A rotating knife 60 having a blade 61 swings against an anvil 59 to cut the web along a line passing through the center of the transverse seals, thus forming individual pouches from the webs. The pouches are immediately received in a transfer mechanism 62, including a conveyor belt 63 coacting with rollers 64 which maintain the separated pouches under control until they can be picked up by the first conveyor 25.

The first conveyor 25 includes an endless chain illustrated by broken lines 68 passing around sprockets 66 and 67. The chain has a sausage-shaped path, and it is to be understood that the chain will ride in curved tracks which will confine the chain to the desired path. The chain carries a plurality of spaced carriers 26, each carrier including valve bodies 70 and a vacuum cup 71. The valve bodies are interconnected by flexible tubing 72 in serial fashion such that the application of vacuum to any one of the valve bodies will evacuate, through the tubing and adjacent valve bodies, all of the carriers. The carriers pass about a spider 73 which is directly connected to a vacuum source. Each arm of the spider is engageable with a valve body to effect the evacuation of that body. Valve means, not shown, are provided to connect the individual arms 73 to the vacuum source during approximately 170° of their excursion around the spider, the angle being indicated at 74.

While the valve structure will be described in detail below, the general operation of each valve in each carrier is such that the valve body is connected to the spider during the 170° transverse, that port being closed just prior to the body leaving the spider so as to avoid the introduction of pressure into the system.

Further, the vacuum cups are sealed off from the valve body until they are in contact with the pouches, thereby avoiding the introduction of atmospheric pressure into the system.

The second conveyor is in the form of a drum with all carriers being at a constant radial distance from the center of the drum. A central vacuum source, not shown, is connected through tubing 80 to the individual carriers 33 and a valve associated with the tubing effects the application of vacuum to the carriers only during the period when they are in contact with pouches.

The carriers 33 will be described in detail below, but in general they present a flat surface area somewhat smaller than the dimension of the pouch so as to hold the individual pouches flat against the surface.

A filling mechanism of conventional design overlies the drum and effects filling of the pouches over approximately 100° of their traverse, the filling angle being indicated by the broken lines 29.

After the pouches are filled, the upper corners of the pouches are gripped and pulled laterally to stretch out any wrinkles which might appear in the mouth of the pouch.

The pouches, with their mouths stretched, pass through the sealing mechanism 30. While the sealing mechanism may be any type adapted to seal a continuously moving pouch, in the illustrated form, the pouches pass between two endless bands 85 and 86 which may be, for example, a teflon-impregnated fiberglass material. The bands pass between two mating bars 87 and 88 which are constantly heated to fuse the thermoplastic film material in the pouches. The pressure of the bands 85 and 86 on the pouches causes the sealing of the film when it becomes tacky.

From the sealing unit 30, the sealed pouches are moved into contact with a portion of the third conveyor 38. The third conveyor 38 is similar to the first conveyor 25 and includes a chain, illustrated by broken lines 90, whose path is delineated by a cam track in which it rides, the chain passing over sprockets 91 and 92. Coaxial with the sprocket 92 is a spider 93 which functions similar to the spider 73 of the first conveyor to apply a vacuum to the carriers 40 as they pass around the spider.

The carriers 40 are interconnected serially by flexible tubing 95 so as to maintain the vacuum on all carrier bodies in the manner described in connection with the first conveyor 25.

The principal difference between the conveyor 38 and the conveyor 25 is that the carriers 40 of conveyor 38 have articulated suction cups 96 adapted normally to ride in a horizontal attitude to bring them into a position to engage and pick up pouches from the drum conveyor 28 and thereafter to be cammed to pivot downwardly through an angle of 90° in which position they overlie the product conveyor 43.

The vacuum to the individual carriers 33 on the drum conveyor 28 is relieved as soon as contact with the pouches is made by the carriers 40 on the third conveyor 38. The vacuum on the carriers 40 is relieved when the carriers are in proper orientation with respect to the product buckets 44 of the product conveyor 43. This is determined by the position of a pin to be described in connection with FIGS. 4 through 7. By varying the number and placement of such valve operating pins, it is possible to determine the number of pouches to be deposited in each product bucket.

THE VACUUM AND VALVE SYSTEM FOR THE FIRST AND THIRD CONVEYORS

Referring to FIGS. 4 through 7, each carrier has a valve 100 which includes a valve body 101 and a reciprocable and rotatable spool 102 mounted in a cylinder 103 in the valve body. The spool has a collar 104 and a compression spring 105 which is located between the valve body and the collar to urge the spool in a downward direction. A cam 106, located adjacent to the vacuum spiders 73 or 93, is adapted to urge the spool upwardly during that portion of its excursion during which vacuum is applied from the spider to the system.

At the upper end of the spool 102 a four-armed star wheel 107 is integrally mounted on the spool, the star wheel having arms A, B, C and D. The arms are adapted to engage pins 108 which may be solenoid actuated to move them into or out of the path of the star wheel 107 as the conditions of operation require. For example, where the function of the pin is to shift the spool to a position in which vacuum is applied to a suction cup, and no pouch is available for the particular suction cup, a sensing device will energize the solenoid to pull the pin out of the way of the star wheel so as to avoid that rotation of the spool which would connect the system to atmosphere.

Each valve body has two lowermost ports 110 and 111 which are permanently connected to the flexible tubing 72 which serially connects all bodies. The spool has a groove 112 which permanently interconnects the ports 110 and 111 so as to continuously maintain an uninterrupted passage between adjoining valve bodies. A third port 113 is located at the lower part of the body at right angles to the ports 110 and 111 and is adapted to be engaged by an arm 114 of either spider 73 or 93. The port 113 is selectively opened to the cylinder when the spool is in its upper position as is illustrated in the right-hand end of FIG. 4 and blocked when the spool is in its lower position as illustrated in the left-hand end of FIG. 4. Thus, the ports 110 and 111 are connected to vacuum only when the spool is cammed upwardly by a cam, such as 106.

Two ports 120 and 121, at right angles to each other, are formed in the upper portion of the valve body and are interconnected to the lower ports by a passageway 122 in the valve body. The port 120 exhausts the cylinder to atmosphere and port 121 connects the cylinder to a suction cup 71 or 96.

The valve has a flat section 124 which, as shown in FIGS. 6 and 7, selectively connects the suction cup to the port 120 to effect the release of the vacuum on the suction cup (FIG. 6) or connects the suction cup to passageway 122 to effect the application of a vacuum to the suction cup (FIG. 7). The length of the flat is great enough that it is operative regardless of whether the spool is in its upper or lower position.

The operation of the evacuated conveyor system can be best understood by considering an excursion of a carrier 26 around the first conveyor 25. As the carrier moves clockwise toward the spider 73, its suction cup is connected to exhaust port 120 and the passageway 122 is sealed off from exhaust by the flat 124 (left side of FIG. 4). When contact of port 113 with an arm of the spider is made, a pin 108 is engaged by the star wheel on the valve to rotate the star wheel through 90°. This brings the flat 124 of the spool to the orientation of FIG. 10, thereby connecting the suction cup to the vacuum source. The spool remains in that angular orientation until time to connect the suction cup to atmosphere after the mouth of the pouch has been pulled apart and the filler inserted. This occurs at the third from the left position as indicated in FIG. 4.

Just prior to a valve body passing beyond the spider 73, the spool drops off the cam 106, thereby closing off the port 113 so that when the valve body leaves the spider, the vacuum within the system will be maintained.

CARRIERS FOR THE FIRST AND THIRD CONVEYORS

Referring to FIG. 2, each valve body 101 has a pair of upper arms 160 and a pair of lower arms 161 by which the block is supported on conveyor chains 68. One of the arms of each pair has a hole which receives a pin 163, the pin being fixed to the chain. The other arm of each pair is slotted (see FIG. 1) to receive another pin 163 fixed to the chain. The slotting of the arms permits a change in the distance to the pins which occurs as the chain passes around the sprocket. The chains ride in tracks 164 which determine the path of the chain and, hence, the path of the carriers.

The carrier 40 for the third conveyor 38 has a valve body 170 substantially identical in function and form as that described above in connection with the carriers 26. The valve body is connected to a manifold 171 by means of flexible tubing 172. The manifold is connected at its lower end to a pivot pin 173 mounted in bracket arms 174 fixed to the valve body 170. The valve body is carried on upper and lower conveyor chains 90 by means of arms 178. Each valve body has two arms, one having a hole at one end to receive a pin 180, and one being slotted at its end (see FIG. 1) to receive another pin 180. The slotted second arm is necessary because of a change in the pin distance as the chain passes about a sprocket at either end of the conveyor.

The manifold 171 carries two suction cups 96 to grip a filled pouch 183. At the upper end of the manifold is mounted a roller 184 which rides in a cam track 185. The cam track is curved outwardly and downwardly to cause the manifold to swing from the vertical position illustrated in full lines in FIG. 3 to a horizontal position illustrated in broken lines in FIG. 3, the horizontal position being that in which the carrier overlies the bucket conveyor 43 of the cartoner.

OPERATION

In the operation of the invention, a web 20 of pouch-forming material is fed over a conventional plow system 50 to fold the web longitudinally. The folded web is passed about a sealing drum 22 to provide a series of spaced transverse seals, thereby forming pockets. The thus formed web is cut by the rotating knife 23 to separate the individual pouches from each other, the individual pouches being immediately picked up by the transfer conveyor 62. As the pouches are discharged from the transfer conveyor, they are engaged by suction cups on the carriers 26. The suction cups carry the pouches into alignment with the carriers 33 on the filling drum 28. As the first conveyor and the filling drum paths slowly diverge, the suction on the respective carriers pulls the pouches slightly open, permitting the introduction of a filling spout. During approximately 100° of travel with the filling spout, the filling mechanism introduces a product into the pouch. After the product has been introduced into the pouch, gripping jaws pull the pouch mouth taut to straighten out any wrinkles and in this condition the pouch passes through the sealing mechanism 30. In the sealing mechanism, the open mouth of the pouch is sealed, thereby providing a pouch sealed on all four edges. The carriers 33 thereafter move into alignment with the carriers 40 on the third conveyor 38. As soon as contact with the carriers 40 is made, the vacuum on the carriers 33 is relieved, thereby permitting the pouches to be transferred from the second conveyor 28 to the carriers 40 on the third conveyor 38. The carriers 40 are cammed from their vertical position into a horizontal position overlying the product buckets of the bucket conveyor 43, and, at preselected times the vacuum on the carriers is relieved to drop the pouches into individual buckets ready for processing in the cartoner.

I claim:

1. Conveyor apparatus comprising, an endless chain,
   means for driving said chain in an endless path,
   a plurality of valve bodies mounted on said chain in spaced relation,
   vacuum operated devices carried by said bodies and operable by said bodies upon evacuation of said bodies to support articles,
   tubing serially interconnecting said bodies and forming an endless path for evacuating all valve bodies, and means including a vacuum source whose location is fixed relative to the path of said chain for engaging said bodies sequentially to apply vacuum to said bodies over at least a portion of their excursion.

2. A conveyor according to claim 1 further comprising, at least two sprockets,
   said chain passing over said sprockets in an endless path,
   a spider having a plurality of arms connected to a vacuum source and mounted on one of said sprockets for rotation therewith,
   said arms being engageable with said valve bodies to evacuate said bodies as each passes said spider.

* * * * *